(12) United States Patent
Harris et al.

(10) Patent No.: US 9,017,886 B2
(45) Date of Patent: Apr. 28, 2015

(54) VARIABLE ANODE FLOW RATE FOR FUEL CELL VEHICLE START-UP

(75) Inventors: Daniel I. Harris, Honeoye Falls, NY (US); Joseph Nicholas Lovria, Honeoye Falls, NY (US); Patrick Frost, Tucson, AZ (US)

(73) Assignee: GM Global Technology Operations LLC, Detroit, MI (US)

( * ) Notice: Subject to any disclaimer, the term of this patent is extended or adjusted under 35 U.S.C. 154(b) by 582 days.

(21) Appl. No.: 12/725,771

(22) Filed: Mar. 17, 2010

(65) Prior Publication Data

US 2011/0229781 A1  Sep. 22, 2011

(51) Int. Cl.
| | |
|---|---|
| *H01M 8/04* | (2006.01) |
| *H01M 8/24* | (2006.01) |
| *H01M 8/10* | (2006.01) |

(52) U.S. Cl.
CPC ...... *H01M 8/04201* (2013.01); *H01M 8/04097* (2013.01); *H01M 8/04223* (2013.01); *H01M 8/04313* (2013.01); *H01M 8/0432* (2013.01); *H01M 8/04388* (2013.01); *H01M 8/04447* (2013.01); *H01M 8/04552* (2013.01); *H01M 8/04589* (2013.01); *H01M 8/04597* (2013.01); *H01M 8/04753* (2013.01); *H01M 8/242* (2013.01); *H01M 2008/1095* (2013.01); *Y02E 60/50* (2013.01)

(58) Field of Classification Search
CPC .............. H01M 8/04; H01M 8/04223; H01M 8/04231; H01M 8/04089; H01M 8/0497; H01M 8/04201; H01M 8/04313; H01M 8/0432; H01M 2008/1095; Y02E 60/50

USPC ................ 429/512–516, 12–13, 18, 25, 34, 429/408–471
See application file for complete search history.

(56) References Cited

U.S. PATENT DOCUMENTS

| | | | | |
|---|---|---|---|---|
| 2005/0129999 | A1* | 6/2005 | Geschwindt et al. | 429/22 |
| 2007/0042235 | A1* | 2/2007 | Kagami et al. | 429/12 |
| 2007/0077472 | A1* | 4/2007 | Uehara et al. | 429/25 |
| 2007/0148512 | A1* | 6/2007 | Goto et al. | 429/23 |
| 2007/0196709 | A1* | 8/2007 | Umayahara et al. | 429/25 |
| 2007/0224463 | A1* | 9/2007 | Morita | 429/12 |
| 2007/0243437 | A1* | 10/2007 | Katano | 429/25 |
| 2007/0254200 | A1* | 11/2007 | Takada et al. | 429/38 |
| 2008/0152972 | A1* | 6/2008 | Igarashi et al. | 429/22 |
| 2008/0160370 | A1* | 7/2008 | Masse et al. | 429/23 |

(Continued)

FOREIGN PATENT DOCUMENTS

| | | |
|---|---|---|
| CN | 1954449 A | 4/2007 |
| CN | 101325261 A | 12/2008 |

(Continued)

*Primary Examiner* — Patrick Ryan
*Assistant Examiner* — Kiran Quraishi
(74) *Attorney, Agent, or Firm* — Fraser Clemens Martin & Miller LLC; James D. Miller (57) ABSTRACT

A fuel cell system is disclosed with a fuel cell stack having a plurality of fuel cells, the fuel cell stack including an anode supply manifold and an anode exhaust manifold, a sensor for measuring at least one of an environmental condition affecting the fuel cell stack and a characteristic of the fuel cell stack, wherein the sensor generates a sensor signal representing the measurement of the sensor; and a processor for receiving the sensor signal, analyzing the sensor signal, and controlling a flow rate of a fluid flowing into the anode supply manifold based upon the analysis of the sensor signal.

7 Claims, 4 Drawing Sheets

(56) References Cited

U.S. PATENT DOCUMENTS

| | | | |
|---|---|---|---|
| 2008/0206622 A1* | 8/2008 | Mitsuta | 429/35 |
| 2008/0311437 A1* | 12/2008 | Sienkowski et al. | 429/13 |
| 2009/0081496 A1* | 3/2009 | Robb et al. | 429/14 |
| 2009/0253008 A1* | 10/2009 | Ishikawa | 429/22 |
| 2010/0190075 A1* | 7/2010 | Frost et al. | 429/433 |

FOREIGN PATENT DOCUMENTS

| | | | | |
|---|---|---|---|---|
| DE | 102007026003 A1 | 12/2008 | | |
| DE | 102008027752 A1 | 1/2009 | | |
| DE | 102008047390 A1 | 4/2009 | | |
| WO | WO 2008069111 A1 * | 6/2008 | | H01M 8/04 |

* cited by examiner

VARIABLE ANODE FLOW RATE FOR FUEL CELL VEHICLE START-UP

FIELD OF THE INVENTION

The invention relates to fuel cell systems. More particularly, the invention is directed to a fuel cell system and a method for facilitating a variable anode flow rate during a start-up of the fuel cell system.

BACKGROUND OF THE INVENTION

A fuel cell has been proposed as a clean, efficient and environmentally responsible power source for electric vehicles and various other applications. In particular, the fuel cell has been identified as a potential alternative for a traditional internal-combustion engine used in modern vehicles.

A typical fuel cell is known as a proton exchange membrane (PEM) fuel cell. The PEM fuel cell includes three basic components: a cathode, an anode and an electrolyte membrane. The cathode and anode typically include a finely divided catalyst, such as platinum, supported on carbon particles and mixed with an ionomer. The electrolyte membrane is sandwiched between the cathode and the anode to form a membrane-electrode-assembly (MEA). The MEA is often disposed between porous diffusion media (DM) which facilitate a delivery of gaseous reactants, typically hydrogen and oxygen from air, for an electrochemical fuel cell reaction. Individual fuel cells can be stacked together in series to form a fuel cell stack. The fuel cell stack is capable of generating a quantity of electricity sufficient to power a vehicle.

During periods of non-operation, a quantity of air accumulates in the anodes of the fuel cell stack. Upon start-up of the fuel cell stack, hydrogen is supplied to the anodes. The hydrogen contacts the air and creates a "hydrogen-air front" that passes over the anodes. The hydrogen-air front is known to degrade fuel cell performance. In particular, the presence of both hydrogen and air on the anode results in a localized short between a portion of the anode that sees hydrogen and a portion of the anode that sees air. The localized short causes a reversal of current flow and increases the cathode interfacial potential, resulting in a rapid corrosion of the fuel cell carbon substrates and catalyst supports. The rate of carbon corrosion has been found to be proportional to a time that the hydrogen-air front exists and a magnitude of the localized voltage at the hydrogen-air front.

It is known in the art to rapidly purge the anodes of the accumulated air with hydrogen and minimize the time that the hydrogen-air front exists on the anodes. The purge is often designed to substantially and evenly fill the anode inlet header with hydrogen without exhausting an excess of hydrogen from the fuel cell system. An illustrative purge method is disclosed in applicant's co-pending U.S. application Ser. No. 11/762,845, incorporated herein by reference in its entirety. Typically, a time required to purge the anodes is calculated in advance, and based on the volume of the fuel cell stack and the flow rate of the hydrogen. However, the quantity of air that has accumulated on the anodes varies with different shut-down periods and conditions. Additionally, variations in pressure, pressure measurements, flow rates, flow control and composition of the gases on the anodes after shut-down periods may vary widely. Therefore, the time required to push the accumulated air from the anodes, as well as the volume and flow rate of hydrogen for purging the anodes, is generally not optimized. As the optimal end point of the purge is often difficult to predict, systems known in the art have been unable to purge the anodes with hydrogen without exhausting an undesirable quantity of hydrogen to the atmosphere.

Additionally, known systems have also employed a dead-short circuit during start-up of the fuel cell stack. In dead-short systems, a circuit with a shorting resistor, for example, is used to minimize the localized voltage during start-up of the fuel cell stack. Resistance to carbon corrosion during start-up of the fuel cell stack is thereby optimized. In order for the dead-short system to work properly, however, each fuel cell in the fuel cell stack must have substantially equal quantities of hydrogen for the duration of the dead-short. A fuel cell that is deficient in hydrogen may experience undesirable, localized "hot-spots" if subjected to the dead-short.

There is a continuing need for a fuel cell system and a method that provide a rapid and reliable start-up. It would be desirable to develop a fuel cell system and a method for facilitating a variable anode flow rate during a start-up of the fuel cell system, wherein the fuel cell system and the method minimize an anode fill time, while also minimizing degradation of the fuel cell system due to a start-up procedure.

SUMMARY OF THE INVENTION

Concordant and consistent with the present invention, a fuel cell system and a method for facilitating a variable anode flow rate during a start-up of the fuel cell system, wherein the fuel cell system and the method minimize an anode fill time, while also minimizing degradation of the fuel cell system due to a start-up procedure, has surprisingly been discovered.

In one embodiment, a fuel cell system comprises: a fuel cell stack having a plurality of fuel cells, the fuel cell stack including an anode supply manifold and an anode exhaust manifold, a sensor for measuring at least one of an environmental condition affecting the fuel cell stack and a characteristic of the fuel cell stack, wherein the sensor generates a sensor signal representing a measurement of the sensor; and a processor for receiving the sensor signal, analyzing the sensor signal, and controlling a flow rate of a fluid flowing into the anode supply manifold based upon the analyzed sensor signal.

In another embodiment, a fuel cell system comprises: a fuel cell stack having a plurality of fuel cells, the fuel cell stack including an anode supply manifold and an anode exhaust manifold, a sensor for measuring at least one of a volume of fluid injected into the anode supply manifold, a voltage across at least one fuel cell, a current supplied from the fuel cell stack, a shut-down time period, and an environmental factor, wherein the sensor generates a sensor signal representing a measurement of the sensor; and a processor for receiving the sensor signal, analyzing the sensor signal, and controlling a flow rate of a fluid flowing into the anode supply manifold based upon the analyzed sensor signal.

The invention also provides methods for controlling a flow rate of a fluid in a fuel cell system.

One method comprises the steps of: providing a fuel cell stack having a plurality of fuel cells, the fuel cell stack including an anode supply manifold and an anode exhaust manifold, measuring at least one of an environmental condition affecting the fuel cell stack and a characteristic of the fuel cell stack; and controlling a flow rate of a fluid flowing into the anode supply manifold based upon an analysis of at least one of the environmental condition measured and the characteristic of the fuel cell stack measured.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which.

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
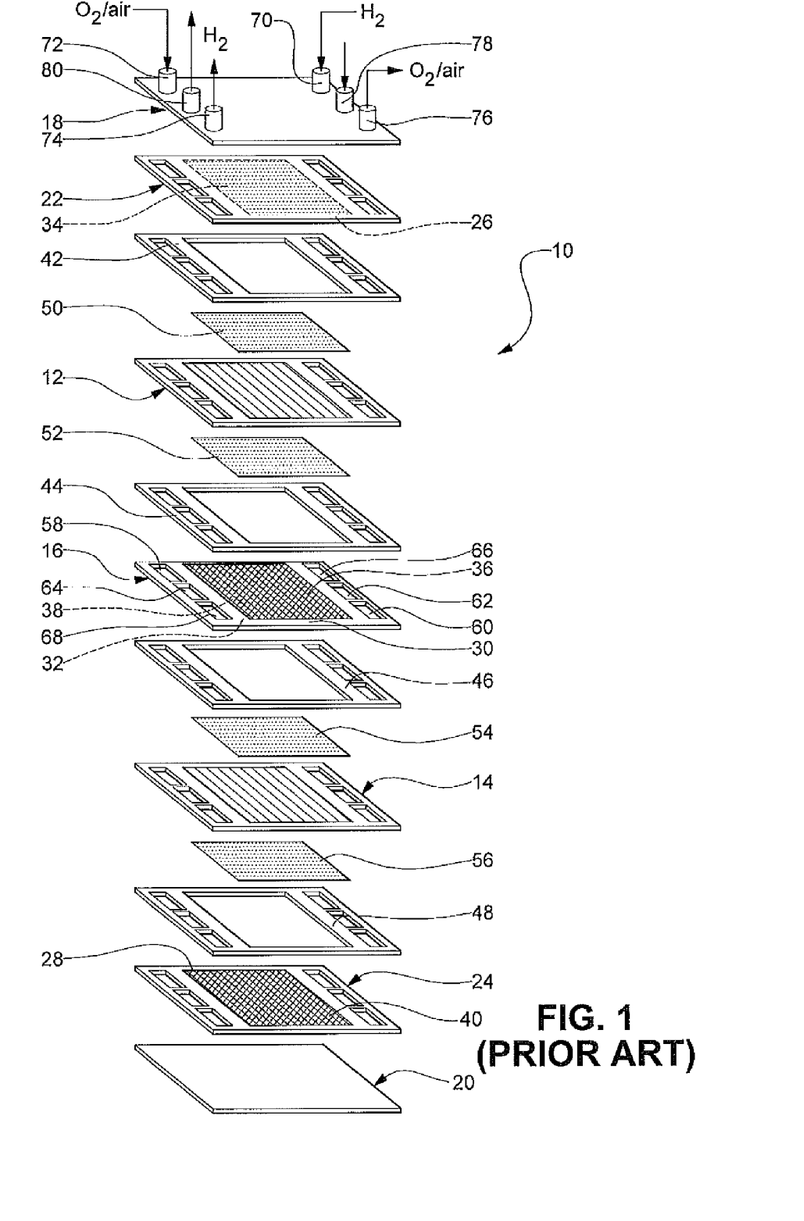
FIG. 1 is a schematic exploded perspective view of a PEM fuel cell stack as is known in the art.

FIG. 1 illustrates a PEM fuel cell stack 10 according to the prior art. For simplicity, only a two-cell stack (i.e. one bipolar plate) is illustrated and described in FIG. 1, it being understood that a typical fuel cell stack will have many more such cells and bipolar plates. The fuel cell stack 10 includes a pair of membrane electrode assemblies (MEAs) 12, 14 separated by an electrically conductive bipolar plate 16. The MEAs 12, 14 and the bipolar plate 16 are stacked between a pair of clamping plates 18, 20 and a pair of unipolar end plates 22, 24. The clamping plates 18, 20 are electrically insulated from the end plates 22, 24 by a gasket or a dielectric coating (not shown). A working face 26, 28 of each of the unipolar end plates 22, 24, as well as the working faces 30, 32 of the bipolar plate 16, include a plurality of grooves or channels 34, 36, 38, 40 adapted to facilitate the flow of a fuel such as hydrogen and an oxidant such as oxygen therethrough. Nonconductive gaskets 42, 44, 46, 48 provide seals and an electrical insulation between the components of the fuel cell stack 10. Gas-permeable diffusion media 50, 52, 54, 56 such as carbon or graphite diffusion papers substantially abut each of an anode face and a cathode face of the MEAs 12, 14. The end plates 22, 24 are disposed adjacent the diffusion media 50, 56 respectively. The bipolar plate 16 is disposed adjacent to the diffusion media 52 on the anode face of the MEA 12 and adjacent the diffusion media 54 on the cathode face of the MEA 14.

As shown, each of the MEAs 12, 14, the bipolar plate 16, the end plates 22, 24, and the gaskets 42, 44, 46, 48 include a cathode supply aperture 58, a cathode exhaust aperture 60, a coolant supply aperture 62, a coolant exhaust aperture 64, an anode supply aperture 66, and an anode exhaust aperture 68. A cathode supply is formed by the alignment of adjacent cathode supply apertures 58 formed in the MEAs 12, 14, the bipolar plate 16, the end plates 22, 24, and the gaskets 42, 44, 46, 48. A cathode exhaust manifold is formed by the alignment of adjacent cathode exhaust apertures 60 formed in the MEAs 12, 14, the bipolar plate 16, the end plates 22, 24, and the gaskets 42, 44, 46, 48. A coolant supply manifold is formed by the alignment of adjacent coolant supply apertures 62 formed in the MEAs 12, 14, the bipolar plate 16, the end plates 22, 24, and the gaskets 42, 44, 46, 48. A coolant exhaust manifold is formed by the alignment of adjacent coolant exhaust apertures 64 formed in the MEAs 12, 14, the bipolar plate 16, the end plates 22, 24, and the gaskets 42, 44, 46, 48. An anode supply manifold is formed by the alignment of adjacent anode supply apertures 66 formed in the MEAs 12, 14, the bipolar plate 16, the end plates 22, 24, and the gaskets 42, 44, 46, 48. An anode exhaust manifold is formed by the alignment of adjacent anode exhaust apertures 68 formed in the MEAs 12, 14, the bipolar plate 16, the end plates 22, 24, and the gaskets 42, 44, 46, 48.

A hydrogen gas is supplied to the fuel cell stack 10 through the anode supply manifold via an anode inlet conduit 70. An oxidant gas is supplied to the fuel cell stack 10 through the cathode supply manifold of the fuel cell stack 10 via a cathode inlet conduit 72. An anode outlet conduit 74 and a cathode outlet conduit 76 are provided for the anode exhaust manifold and the cathode exhaust manifold, respectively. A coolant inlet conduit 78 and a coolant outlet conduit 80 are in fluid communication with the coolant supply manifold and the coolant exhaust manifold to provide a flow of a liquid coolant there through. It is understood that the configurations of the various inlets 70, 72, 78 and outlets 74, 76, 80 in FIG. 1 are for the purpose of illustration, and other configurations may be chosen as desired.

Figure 2:
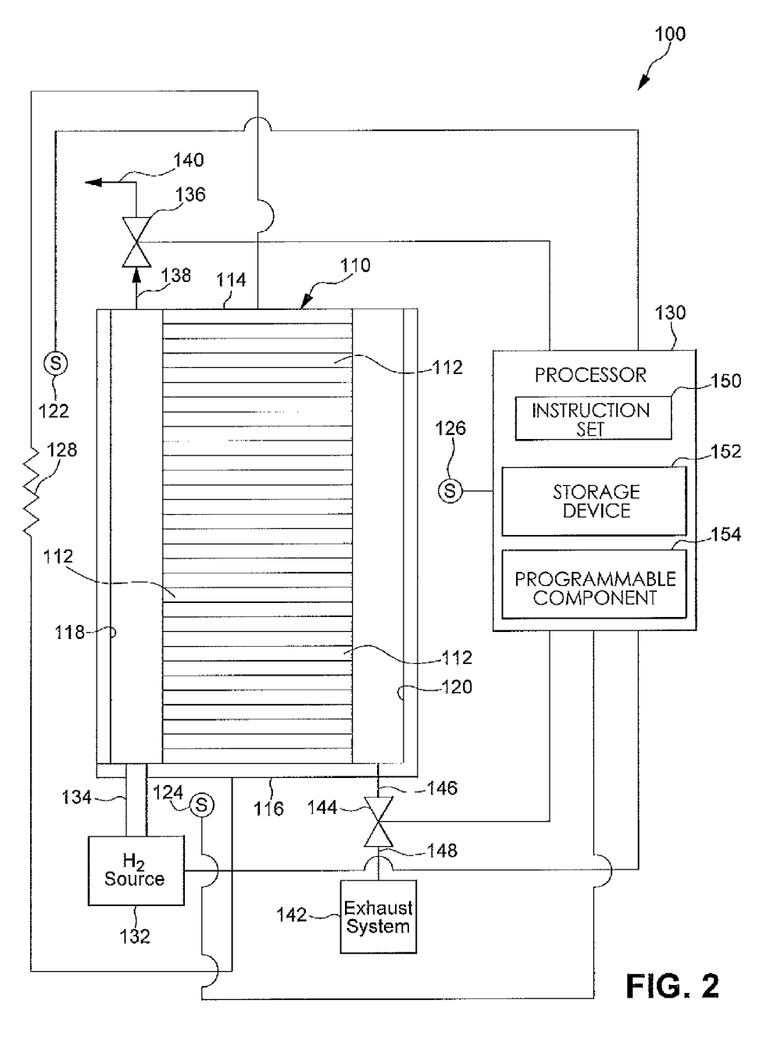
FIG. 2 is a schematic cross-sectional elevational view of a fuel cell system according to an embodiment of the present invention.

FIG. 2 shows an anode side of a fuel cell system 100 according to an embodiment of the invention. The fuel cell system 100 includes a fuel cell stack 110 having a plurality of fuel cells 112. Each of the fuel cells 112 has an anode (not shown) and a cathode (not shown) with an electrolyte membrane (not shown) disposed therebetween. The fuel cell stack 110 further includes a first end 114 and a second end 116. As described herein, the first end 114 is known as the "dry end" and the second end 116 is known as the "wet end."

In the embodiment shown, the fuel cell system 100 includes an anode supply manifold 118, an anode exhaust manifold 120, a plurality of sensors 122, 124, 126, a resistive device 128, and a processor 130. It is understood that additional components and systems may be included in the fuel cell system 100 such as a recycle sub-system, for example.

The anode supply manifold 118 is in communication with the anodes of the fuel cells 112 and provides fluid communication between a source of hydrogen 132 and the fuel cells 112. It is understood that other fluid sources may be used such as nitrogen and air, for example. As shown, the anode supply manifold 118 receives a flow of gaseous hydrogen through an anode inlet conduit 134 from the source of hydrogen 132. The anode inlet conduit 134 defines a volume between the source of hydrogen 132 and the anode supply manifold 118. It is understood that the anode inlet conduit 134 may have any desired cross-sectional area and may further include a chamber, for example. As illustrated, the fuel cell system 100 includes a first valve 136, also known as a purge valve, in fluid communication with the anode supply manifold 118. The first valve 136 is disposed at the first end 114 of the fuel cell stack 110, spaced from the anode inlet conduit 134. The first valve 136 includes an inlet 138 for receiving a fluid flow and an outlet 140 for exhausting a fluid when the first valve 136 is in an open position.

The anode exhaust manifold 120 of the fuel cell system 100 provides fluid communication between the anodes of the plurality of fuel cells 112 and an exhaust system 142. The anode exhaust manifold 120 receives the fluid flowing through the anodes of the fuel cells 112. The fluid caused to flow through the anodes may be gaseous hydrogen, air, or water. A second valve 144 is in fluid communication with the anode exhaust manifold 120 and is disposed at the second end 116 of the fuel cell stack 110. The second valve 144 facilitates purging or flushing of a fluid from the anode exhaust manifold 120. It is understood that the second valve 144 may be disposed at the first end 114 of the fuel cell stack 110, if desired. It is further understood that the second valve 144 may flush fluid to a cathode inlet (not shown), for example. Specifically, the second valve 144 includes an inlet 146 for receiving a fluid flow and an outlet 148 for exhausting a fluid when the second valve 144 is in an open position.

The sensors 122, 124, 126 provide a means to measure characteristics of the fuel cell system 100 and a surrounding environment. Specifically, at least one of the sensors 122, 124, 126 is adapted to measure a voltage across at least one of the fuel cells 112. Another one of the sensors 122, 124, 126 is adapted to measure a characteristic of the fluid flowing into the anode supply manifold 118 such as a cumulative volume of the fluid, for example. Another one of the sensors 122, 124, 126 is adapted to measure an environmental characteristic affecting the fuel cell stack 110. As a non-limiting example, the environmental characteristic is one of a temperature, a time period, a composition of a fluid flowing through the anode side of the fuel cell stack 110, an age of the fuel cell stack 110, and a pressure level at various points in the fuel cell system 100. It is understood that other characteristics and system parameters may be measured such as a current flowing through the resistive (ohmic) device 128, for example. It is further understood that each of the sensors 122, 124, 126 is adapted to transmit a sensor signal to the processor 130, wherein the sensor signal represents the measurement data of an associated one of the sensors 122, 124, 126.

The resistive device 128 is in electrical communication with the fuel cell stack 110. The resistive device 128 may be adjustable to place a desired resistive load on the fuel cell stack 110. However, a skilled artisan should understand that other suitable resistive loads may be used as desired. In an illustrative embodiment, the resistive device 128 is adapted to place a resistive load on the fuel cell stack 110 during startup, thereby limiting cell potential and militating against fuel cell degradation induced by carbon corrosion. As a non-limiting example, the resistive device 128 is coupled to a plurality of terminals (not shown) of the fuel cell stack 110, the resistive device 128 adapted to short the fuel cell stack 110 as desired.

The processor 130 illustrated is in communication with the sensors 122, 124, 126, the source of hydrogen 132, the first valve 136, and the second valve 144. As such, the processor 130 is adapted to receive each of the sensor signals transmitted from the sensors 122, 124, 126, analyze the sensor signals, and control a flow rate of a fluid flowing into the anode supply manifold 118 in response to the analysis of the sensor signals. It is understood that the processor 130 may control a flow rate of a fluid flowing into the anode supply manifold 118 by controlling an open/closed position of the valves 136, 144. It is further understood that the processor 130 may directly control a flow of fluid from the source of hydrogen 132 by regulating an injector, for example.

As shown, the processor 130 analyzes and evaluates the sensor signals based upon an instruction set 150. The instruction set 150, which may be embodied within any computer readable medium, includes algorithms, formulas, and processor executable instructions for configuring the processor 130 to perform a variety of tasks. It is understood that the processor 130 may execute a variety functions such as controlling the functions of the sensors 122, 124, 126.

In certain embodiments, the processor 130 may include a storage device 152. The storage device 152 may be a single storage device or may be multiple storage devices. Furthermore, the storage device 152 may be a solid state storage system, a magnetic storage system, an optical storage system or any other suitable storage system or device. It is understood that the storage device 152 is adapted to store the instruction set 150. Other data and information may be stored in the storage device 152, as desired.

The processor 130 may further include a programmable component 154. It is understood that the programmable component 154 may be in communication with any other component of the fuel cell system 100 such as the sensors 122, 124, 126, for example. In certain embodiments, the programmable component 154 is adapted to manage and control processing functions of the processor 130. Specifically, the programmable component 154 is adapted to control the analysis of the sensor signals. It is understood that the programmable component 154 may be adapted to store data and information on the storage device 152, and retrieve data and information from the storage device 152.

Figure 3:
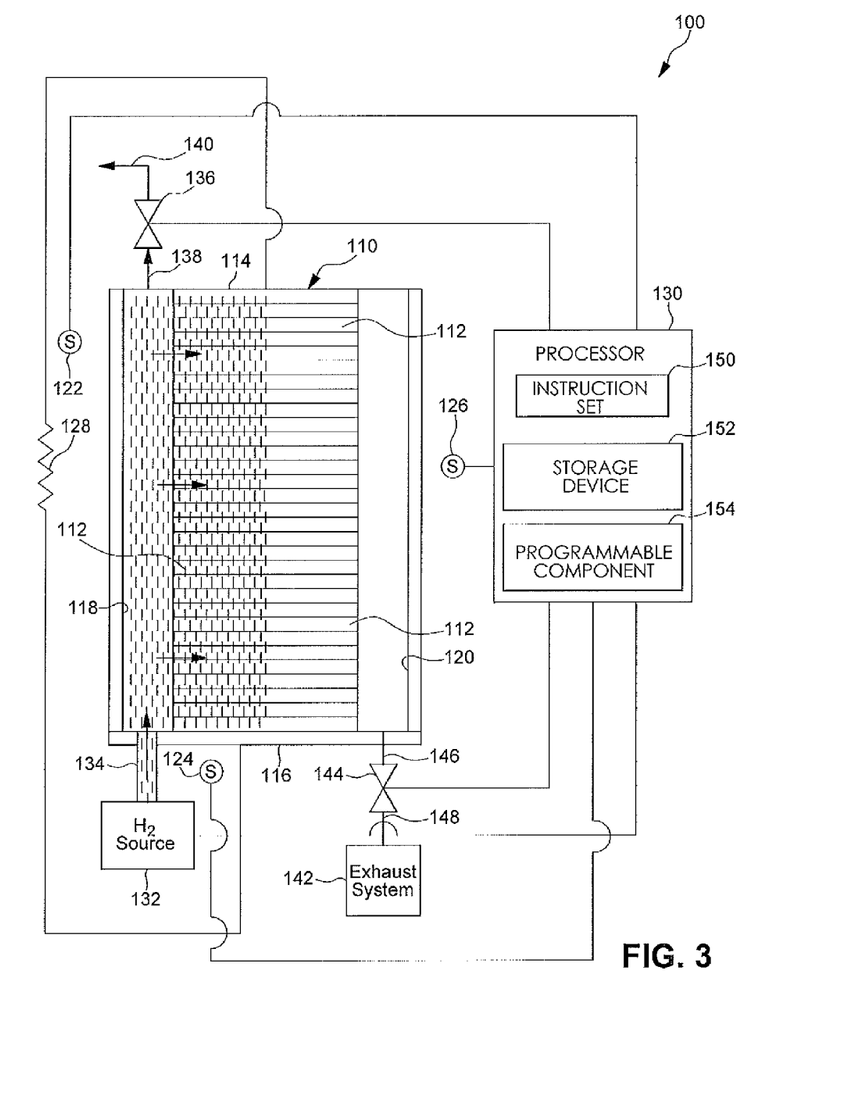
FIG. 3 is a schematic cross-sectional elevational view of the fuel cell system of FIG. 2, showing a stack flush procedure.

In use, gaseous hydrogen is supplied to the anode supply manifold 118, thereby causing hydrogen to flow through the active areas of the anode portions of each of the fuel cells 112, as shown in FIG. 3. As hydrogen flows through the active areas of the fuel cells 112, air is purged from the fuel cells 112 and the anode exhaust manifold 120 through the second valve 144 (referred to as an anode fill or stack flush procedure).

In certain embodiments, the stack flush procedure may be executed following a header purge procedure. During the header purge procedure, the first valve 136 and the second valve 144 are closed and gaseous hydrogen is caused to flow from the hydrogen source 132 and into the anode inlet conduit 134 with no substantial amount of gaseous hydrogen flowing into the anode supply manifold 118. Because the valves 136, 144 are closed, a flow of hydrogen into the anode inlet conduit 134 causes the contents of the anode supply manifold 118, typically air, to flow into the active area of the fuel cell stack 110. During a pressure build step, the fluid pressure within the fuel cell stack 110 is increased by continuing to introduce hydrogen into the anode inlet conduit 134. Once a desired pressure in the fuel cell stack 110 is reached, the first valve 136 is opened and the gaseous hydrogen flows into and through the anode supply manifold 118. Since the active areas of the fuel cells 112 in the fuels cell stack 110 are pressurized, the gaseous hydrogen is caused to flow through the anode supply manifold 118 and to the first valve 136, but is not permitted to flow into the active areas of the fuel cells 112. Once the gaseous hydrogen has substantially filled the anode supply manifold 118, the first valve 136 is closed. Next, the second valve 144 is opened, and the gaseous hydrogen is continuously supplied to the anode supply manifold 118, thereby causing hydrogen to flow through the active areas of the anode portions of each of the fuel cells 112.

It is understood that the flow rate of hydrogen through the active areas of the fuel cells 112 may be maximized in order to minimize the time any hydrogen-air fronts are present in the active area of the fuel cell stack 110 and to minimize start-up time. Specifically, favorable results have been achieved where a hydrogen flow rate is maximized and a voltage across the fuel cells 112 is minimized. As a non-limiting example, to achieve a low initial voltage across the fuel cells 112 for a standard start-up procedure, hydrogen injection into the anode supply manifold 118 is scheduled according to at least one of the following: a total volume of hydrogen injected into the anode subsystem (analogous to the location of the hydrogen/air front); a measured cell voltage, an elapsed time, and environmental factors.

Specifically, each of the sensors 122, 124, 126, measure characteristics and levels at various positions in the fuel cell system 100. Each of the sensors 122, 124, 126, transmits the sensor signal representing the measured data and information to the processor 130. Once received, the processor 130 analyzes the data and information represented by each of the sensor signals and controls the flow rate of the hydrogen gas flowing into the anode inlet conduit 134. It is understood that the processor 130 may directly control the flow rate of the hydrogen gas by regulating an injector or supply control device. It is further understood that the processor 130 may control the flow rate of the hydrogen gas by regulating the open/close position of the valves 136, 144.

As a non-limiting example, as hydrogen gas flows into the anode inlet conduit 134, the total volume of the hydrogen gas injected is measured by at least one of the sensors 122, 124, 126 and the processor 130 estimates the location of a hydrogen/air front based upon the measured volume. Accordingly, the injection flow rate is modified as the hydrogen/air front reaches a pre-determined location (e.g. an end of the fuel cells 112).

As a further example, as hydrogen gas flows into the active areas of the fuel cells 112, a range of cell voltages (between a minimum cell voltage and a maximum cell voltage) increases until the fuel cells 112 have excess hydrogen. Thus, at least one of the sensors 122, 124, 126 measures a voltage across at least one of the fuel cells 112 and the processor 130 regulates the hydrogen injection flow rate in response to the measured voltage. In certain embodiments, the hydrogen injection flow rate remains constant until a voltage peak is detected. Thereafter, the flow rate is modified.

As yet another example, as hydrogen flows into the active areas of the fuel cells 112, an electric current supplied from the fuel cell stack 110 to the resistive load represents a function of an oxidation state of the anode and cathode electrodes. Because the anode is being filled with hydrogen, the anode current-carrying capability is increasing throughout the anode fill. Due to a lack of fresh air supplied to the cathode, the ability of the cathode to produce current is decreasing throughout the start up. When corrected for concentration cell current, the peak of the stack current measured during the start up will signify the end of anode starvation and the beginning of cathode starvation. The hydrogen injection flow rate remains constant until the current peak is detected, where it is then modified.

Figure 4:
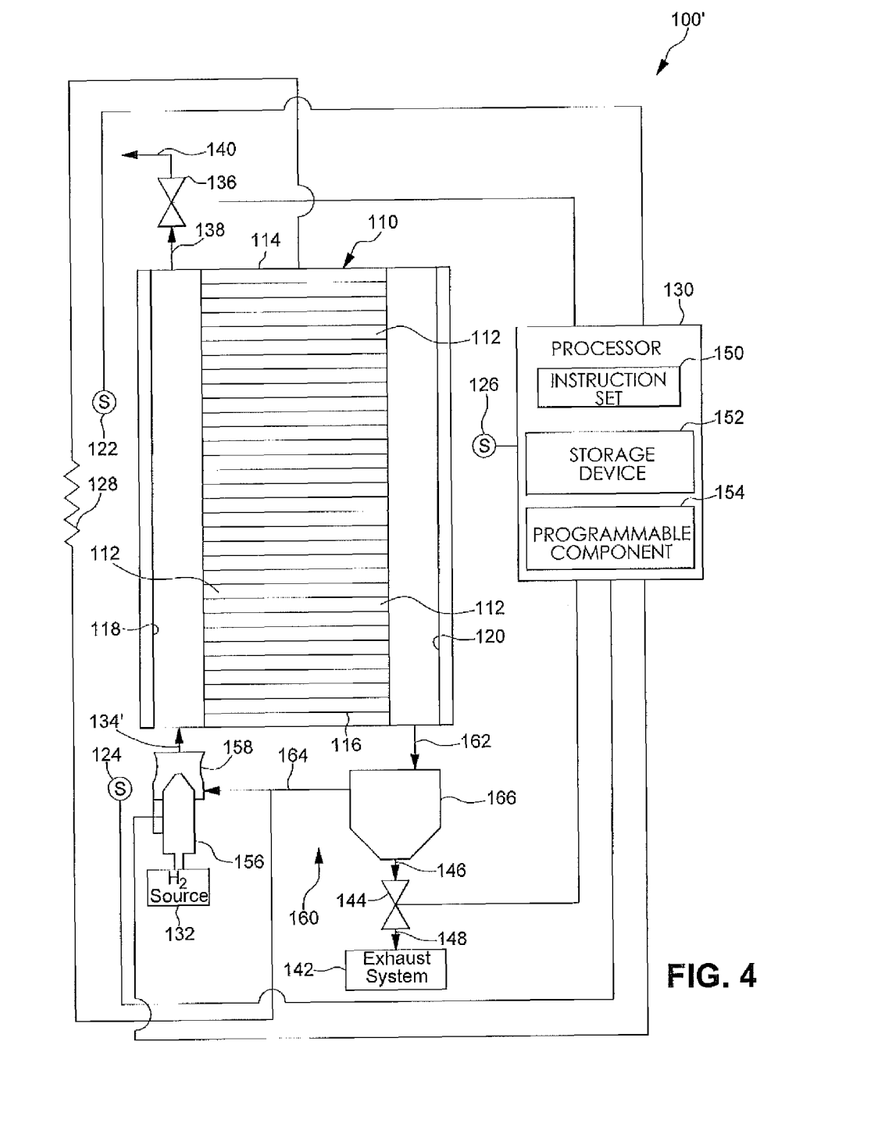
FIG. 4 is a schematic cross-sectional elevational view of a fuel cell system according to another embodiment of the present invention.

FIG. 4 illustrates an anode side of a fuel cell system 100' according to another embodiment of the present invention similar to the fuel cell system 100 of FIG. 2, except as described below. Structure repeated from the description of FIG. 2 includes the same reference numeral. Variations of structure shown in FIG. 2 include the same reference numeral and a prime (') symbol. As shown in FIG. 4, the fuel cell system 100 further includes a fuel injector 156, a jet pump 158, and a recycle loop 160. It is understood that additional components and systems may be included in the fuel cell system 100', as desired.

The fuel injector 156 and the jet pump 158 are disposed between the source of hydrogen 132 and the anode inlet conduit 134'. The injector 156 and the jet pump 158 provide control over the flow of hydrogen into the anode inlet conduit 134'. It is understood that additional components may be in communication with the source of hydrogen 132 and the anode inlet conduit 134' such as a pressure regulator and recirculation pump, for example. Other components or systems may be in communication with the anode inlet conduit 134', as desired.

The anode exhaust manifold 120 of the fuel cell system 100' provides fluid communication between the anodes of the fuel cells 112, and at least one of the exhaust system 142 and the recycle loop 160. The anode exhaust manifold 120 receives a fluid flowing through the anodes of the fuel cells 112. As a non-limiting example, the fluid caused to flow through the anodes may be gaseous hydrogen, air, or water. Other fluids may be used, as desired. In the embodiment shown, the fuel cell system 100' includes an anode exhaust conduit 162 in fluid communication with the anode exhaust manifold 120. The anode exhaust conduit 162 defines a volume between the anode exhaust manifold 120 and at least one of the exhaust system 142 and the recycle loop 160. It is understood that the anode exhaust conduit 162 may have any desired cross-sectional area and may further include a chamber, for example.

The recycle loop 160 provides fluid communication between the anode exhaust manifold 120 and the anode supply manifold 118. In certain embodiments, the recycle loop 160 includes at least a portion of the anode inlet conduit 134', at least a portion of the anode exhaust conduit 162, a recycle conduit 164, and a water separator 166. However, it is understood that other components may be included, as desired.

The recycle conduit 164 defines a volume between the anode inlet conduit 134' and the anode exhaust conduit 162. It is understood that the recycle conduit 164 may have any desired cross-sectional area and may further include a chamber, for example. In the embodiment shown, the recycle conduit 164 is in fluid communication with the water separator 166 and the jet pump 158. It is understood that the recycle conduit 164 may be in direct communication with at least one of the anode inlet conduit 134', the anode supply manifold 118, the anode exhaust manifold 120, and the anode exhaust conduit 162. It is further understood that other components or systems may be disposed between the recycle conduit 164 and at least one of the anode inlet conduit 134', the anode supply manifold 118, the anode exhaust manifold 120, and the anode exhaust conduit 162, as desired.

The water separator 166 is disposed between the anode exhaust conduit 162 and the recycle conduit 164 and is adapted to remove excess humidification or product water from the fluid received from the anode exhaust conduit 162. Accordingly, the water separator 166 is in fluid communication with the second valve 144. The second valve 144 drains or bleeds the product water collected in the water separator 144. As shown, the second valve 144 is in further fluid communication with the exhaust system 142 and is adapted to drain the product water into the exhaust system 142. However, it is understood that the second valve 144 may drain the product water into any system or device, as desired. It is further understood that additional valves and control devices may be included, as desired.

In use, gaseous hydrogen is supplied to the anode supply manifold 118, thereby causing hydrogen to flow through the active areas of the anode portions of each of the fuel cells 112. As hydrogen flows through the active areas of the fuel cells 112, air is purged from the fuel cells 112 and the anode exhaust manifold 120 through the second valve 144 (referred to as an anode fill or stack flush procedure). It is understood that the flow rate of hydrogen through the active areas of the fuel cells may be maximized in order to minimize the time any hydrogen-air fronts are present in the active area of the fuel cell stack 110. Specifically, favorable results have been achieved where a hydrogen flow rate is maximized and a voltage across the fuel cells 112 is maintained as low as possible.

As a non-limiting example, to achieve a low initial voltage across the fuel cells 112 for a standard start-up procedure, hydrogen injection into the anode supply manifold 118 is scheduled according to at least one of the following: a total volume of hydrogen injected into the anode subsystem (analogous to the location of the hydrogen/air front); a measured cell voltage, an elapsed time, and environmental factors.

Specifically, each of the sensors 122, 124, 126, measure characteristics and levels at various positions in the fuel cell system 100. Each of the sensors 122, 124, 126, transmits the sensor signal representing the measured data and information to the processor 130. Once received, the processor 130 analyzes the data and information represented by each of the sensor signals and controls the flow rate of the hydrogen gas flowing into the anode inlet conduit 134. It is understood that the processor 130 may directly control the flow rate of the hydrogen gas by regulating the fuel injector 156. It is further understood that the processor 130 may control the flow rate of the hydrogen gas by regulating the open/close position of the valves 136, 144.

Accordingly, the fuel cell system 100, 100' and method for variable anode flow rate during a start-up procedure of the fuel cell system provide a basis to tune and modify the fuel cell start-up to maximize efficiency, durability, and reliability of the fuel cell system 100, 100' from beginning-of-life to end-of-life. Specifically, the fuel cell system 100, 100' and method minimize an anode fill time, while also minimizing degradation of the fuel cell system due to a start-up procedure From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A fuel cell system comprising:
a fuel cell stack having a plurality of fuel cells arranged in a stack orientation and having opposing first and second ends, the fuel cell stack including an anode supply manifold and an anode exhaust manifold;
a source of hydrogen with an injector positioned adjacent the second end of the fuel cell stack;
an anode inlet conduit and an anode exhaust conduit, wherein the anode inlet conduit provides fluid communication between the anode supply manifold and the source of hydrogen and the anode exhaust conduit is in fluid communication with the anode exhaust manifold, wherein the injector is disposed between the source of hydrogen and the anode inlet conduit;
a first valve positioned adjacent the first end of the fuel cell stack and in fluid communication with the anode supply manifold, the first valve disposed at an opposite end of the anode supply manifold from the anode inlet conduit;
a second valve in fluid communication with the anode exhaust manifold;
a fluid flow sensor for measuring a cumulative volume of a fluid flowing into the anode supply manifold, wherein the fluid flow sensor generates a fluid flow sensor signal representing a measurement of the fluid flow sensor; and
a processor in communication with the fluid flow sensor, the first valve, the second valve, and the injector, wherein the processor receives the fluid flow sensor signal, analyzes the sensor signal, and controls at least one of the first valve, the second valve, and also directly controls the injector to control a flow of a fluid from the source of hydrogen, to vary a flow rate of the fluid flowing into the anode supply manifold based upon the analyzed sensor signal during a start-up procedure of the fuel cell system;
wherein the varying of the flow rate of the fluid flowing into the anode supply manifold is based upon the analysis of the fluid flow sensor signal by the processor, wherein the processor estimates the location of a hydrogen/air front based upon the measured cumulative volume of the fluid flowed into the anode supply manifold and modifies the flow as the hydrogen/air front reaches a pre-determined location.

2. The fuel cell system according to claim 1, further comprising a resistive load in electrical communication with the fuel cell stack, wherein the sensor measures a current through the resistive load and the flow rate of the fluid flowing into the anode supply manifold is modified in response to the current measured.

3. A method for controlling a flow rate of a fluid in a fuel cell system, the method comprising the steps of:
providing a fuel cell stack having a plurality of fuel cells arranged in a stack orientation and having opposing first and second ends, the fuel cell stack including an anode supply manifold and an anode exhaust manifold, a source of hydrogen with an injector positioned adjacent the second end of the fuel cell stack, an anode inlet conduit and an anode exhaust conduit, wherein the anode inlet conduit provides fluid communication between the anode supply manifold and the source of hydrogen and the anode exhaust conduit is in fluid communication with the anode exhaust manifold, wherein the injector is disposed between the source of hydrogen and the anode inlet conduit, a first valve positioned adjacent the first end of the fuel cell stack and in fluid communication with the anode supply manifold, wherein the first valve receives and exhausts a fluid flow from the anode supply manifold when the first valve is in an open position, a second valve in fluid communication with the anode exhaust manifold, wherein the second valve receives and exhausts a fluid flow from the anode exhaust manifold when the second valve is in the open position, a voltage sensor for measuring a voltage across at least one of the fuel cells, wherein the voltage sensor generates a voltage sensor signal representing measurements of the voltage sensor, a fluid flow sensor for measuring a cumulative volume of a fluid flowing into the anode supply manifold, wherein the fluid flow sensor generates a fluid flow sensor signal representing a measurement of the fluid flow sensor, and an environmental characteristic sensor for measuring at least one of an temperature, a time period, a fluid composition, an age of the fuel cell stack, and a pressure, wherein the environmental characteristic sensor generates an environmental characteristic sensor signal representing a measurement of the environmental characteristic sensor, and a processor in communication with each of the voltage sensor, the fluid flow sensor, the environmental sensor, the first valve, the second valve, and the injector, wherein the processor receives sensor signals including the voltage sensor signal, the fluid flow sensor signal, and the environmental sensor signal, analyzes the sensor signals, and controls at least one of the first valve, the second valve, and also directly controls the injector to control a flow of a fluid from the source of hydrogen, to vary a flow rate of the fluid flowing into the anode supply manifold based upon the analyzed sensor signals during a start-up procedure of the fuel cell system;
transmitting the voltage sensor signal, the fluid flow sensor signal, and the environmental characteristic sensor signal to the processor, wherein the processor performs an analysis of the sensor signals based upon an instruction set; and
varying by the processor a flow rate of a fluid flowing into the anode supply manifold based upon the analysis of at least one of the sensor signals by controlling at least one of the first valve and the second valve, and also by directly controlling the injector of the source of hydrogen;

wherein the varying of the flow rate of fluid flowing into the anode supply manifold is based upon the analysis of the fluid flow sensor signal by the processor, wherein the processor estimates the location of a hydrogen/air front based upon the measured cumulative volume of the fluid flowed into the anode supply manifold and modifies the flow as the hydrogen/air front reaches a pre-determined location.

4. The fuel cell system according to claim 1, further comprising a recycle conduit in fluid communication with the anode exhaust manifold and the anode supply manifold.

5. The fuel cell system according to claim 1, further comprising a separator disposed between the anode exhaust conduit and the recycle conduit, wherein the separator removes at least one of humidification and product water from a fluid received from the anode exhaust conduit.

6. The method according to claim 3, wherein the varying of the flow rate of fluid flowing into the anode supply manifold is based upon the analysis of voltage sensor signal by the processor, wherein the flow rate is modified in response to a change in voltage across at least one of the fuel cells.

7. A method for controlling a flow rate of a fluid in a fuel cell system, the method comprising the steps of:

providing a fuel cell stack having a plurality of fuel cells arranged in a stack orientation, the fuel cell stack including an anode supply manifold and an anode exhaust manifold, a source of hydrogen with an injector, an anode inlet conduit and an anode exhaust conduit, wherein the anode inlet conduit provides fluid communication between the anode supply manifold and the source of hydrogen and the anode exhaust conduit is in fluid communication with the anode exhaust manifold, a fluid flow sensor for measuring a cumulative volume of a fluid flowing into the anode supply manifold, wherein the fluid flow sensor generates a fluid flow sensor signal, and a processor in communication with and receiving the fluid flow sensor signal from the processor in communication with the fluid flow sensor and the injector, wherein the processor analyzes the fluid flow sensor signal, and directly controls the injector to control a flow of a fluid from the source of hydrogen, to vary a flow rate of the fluid flowing into the anode supply manifold;

the processor performing an analysis of the fluid flow sensor signal based upon an instruction set and varying a flow rate of the fluid flowing into the anode supply manifold based upon the analysis of the fluid flow sensor signal by directly controlling the injector of the source of hydrogen;

wherein the varying of the flow rate of the fluid includes the processor estimating the location of a hydrogen/air front based upon a measured cumulative volume of the fluid flowed into the anode supply manifold and modifying the flow as the hydrogen/air front reaches a pre-determined location.

* * * * *